United States Patent
Fujii et al.

(10) Patent No.: US 8,182,854 B2
(45) Date of Patent: May 22, 2012

(54) COFFEE DRINK COMPOSITION

(75) Inventors: Akihiko Fujii, Haga-gun (JP); Yoshie Yamasaki, Haga-gun (JP); Hideo Oominami, Haga-gun (JP); Ryuji Ochiai, Haga-gun (JP); Yusuke Shibuya, Haga-gun (JP)

(73) Assignee: Kao Corporation, Tokyo (JP)

( * ) Notice: Subject to any disclaimer, the term of this patent is extended or adjusted under 35 U.S.C. 154(b) by 1390 days.

(21) Appl. No.: 10/587,258

(22) PCT Filed: Jan. 27, 2005

(86) PCT No.: PCT/JP2005/001093
§ 371 (c)(1),
(2), (4) Date: Jul. 26, 2006

(87) PCT Pub. No.: WO2005/072534
PCT Pub. Date: Aug. 11, 2005

(65) Prior Publication Data
US 2007/0116850 A1  May 24, 2007

(30) Foreign Application Priority Data

Jan. 30, 2004  (JP) ................................. 2004-024246
Dec. 28, 2004  (JP) ................................. 2004-379782

(51) Int. Cl.
*A23F 5/00* (2006.01)
(52) U.S. Cl. ........ 426/422; 426/106; 426/424; 426/594; 426/655
(58) Field of Classification Search .................. None
See application file for complete search history.

(56) References Cited

U.S. PATENT DOCUMENTS

| 2,430,663 A | * | 11/1947 | Behrman ...................... 426/124 |
| 3,615,666 A | * | 10/1971 | Schlichter et al. ............ 426/386 |
| 5,087,469 A | | 2/1992 | Acree |
| 6,093,436 A | | 7/2000 | Zheng et al. |

FOREIGN PATENT DOCUMENTS

| EP | 0128333 | 12/1984 |
| GB | 354942 A | 8/1931 |
| JP | 57 28089 | 2/1982 |
| JP | A-H03-127950 | 5/1991 |
| JP | 4 360647 | 12/1992 |
| JP | 5 111437 | 5/1993 |
| JP | 6 315434 | 11/1994 |
| JP | B-H04-29326 | 5/1995 |
| JP | 7 313063 | 12/1995 |
| JP | 10 4919 | 1/1998 |

(Continued)

OTHER PUBLICATIONS

Itakura, Japanese Journal of Nutritional Assessment vol. 19, No. 3, (2002) with partial English Language Translation.
Stadler, et al., Mutation Research 16, 308(2) (1994) pp. 177-190.
U.S. Appl. No. 10/586,609, filed Jul. 19, 2006, Fujii, et al.

(Continued)

*Primary Examiner* — Humera Sheikh
*Assistant Examiner* — Felicia King
(74) *Attorney, Agent, or Firm* — Oblon, Spivak, McClelland, Maier & Neustadt, L.L.P.

(57) ABSTRACT

Provided is a coffee composition which does not generate hydrogen peroxide in the body even if it is taken for long periods of time. The coffee composition has a hydroxyhydroquinone content of 0 to 0.00005 wt. %.

8 Claims, 5 Drawing Sheets

FOREIGN PATENT DOCUMENTS

| JP | A-H11-266842 | 10/1999 |
|---|---|---|
| JP | A-2003-81824 | 3/2003 |
| JP | 2003 304812 | 10/2003 |

OTHER PUBLICATIONS

Hiramoto, Kazuyuki et al.,"Benzene Active Metabolite Contained in Coffee", The Japanese Environmental Mutagen Society, p. 106, $27^{th}$, 1998. (With Partial English Translation).

Hiramoto, Kazuyuki et al.,"Production and Inhibition of Hydrogen Peroxide from Hydroxyhydroquinone (HHQ) in Coffee", The Japanese Environmental Mutagen Society, p. 88, $29^{th}$, 2000. (With Partial English Translation).

Hiramoto, Kazuyuki et al.,"Urinary Excretion of Hydrogen Peroxide by Coffee Dinking", The Japanese Environmental Mutagen Society, p. 90, $31^{th}$, 2002. (With Partial English Translation).

Darby & Darby Mar. 25, 2009 letter, received by Applicants' representative Mar. 26, 2009.

Jeanne B. Martin, et al., "Mortality Patterns Among Hypertensives by Reported Level of Caffeine Consumption", Preventative Medicine 17, (1988), pp. 310-320.

Richard H. Adamson, "Evaluation of Coffee and Caffeine for Mutagenic, Carcinogenic, and Anticarcinogenic Activity", American Chemical Society 2000, Chapter 9, pp. 71-77.

Taiwanese Office Action, Apr. 6, 2011, in corresponding Taiwanese Patent Application No. 094102727 disclosing only names of references in English.

Hiramoto, et al., "Increased Urinary Hydrogen Peroxide Levels Caused by Coffee Drinking", Biol. Pharm. Bull. 2002, vol. 25, No. 11, pp. 1467-1471.

* cited by examiner

[FIG. 1]
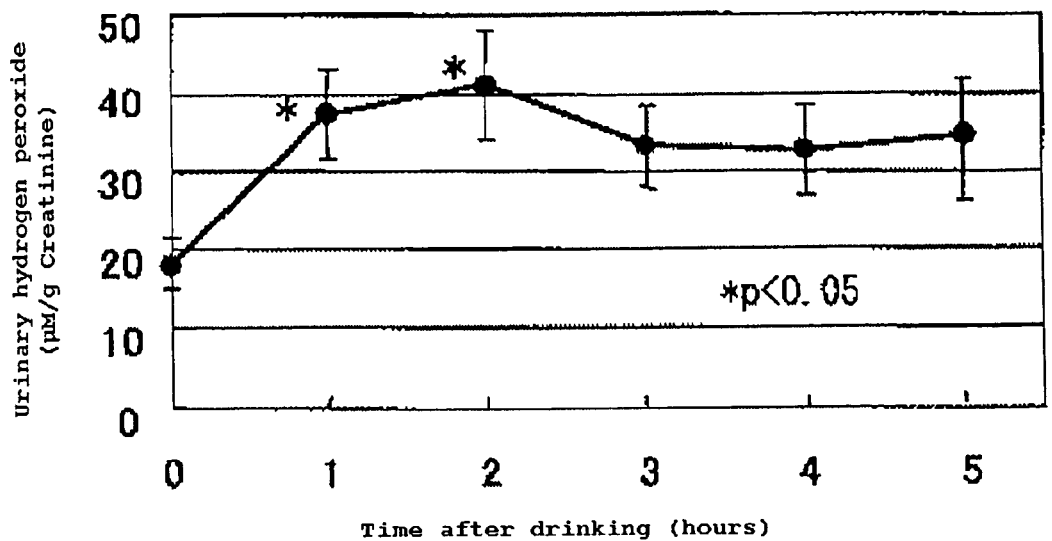
[FIG. 2]
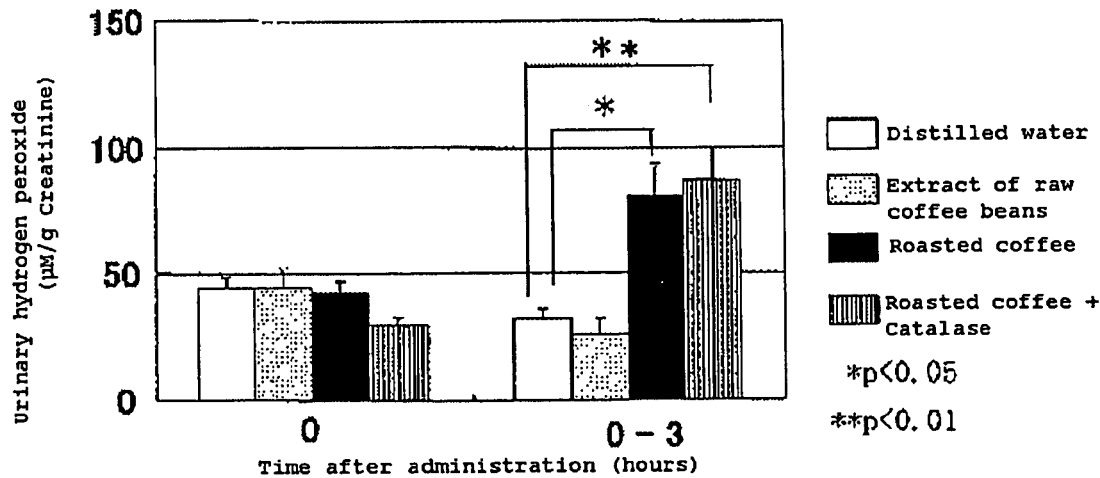

[FIG. 3]
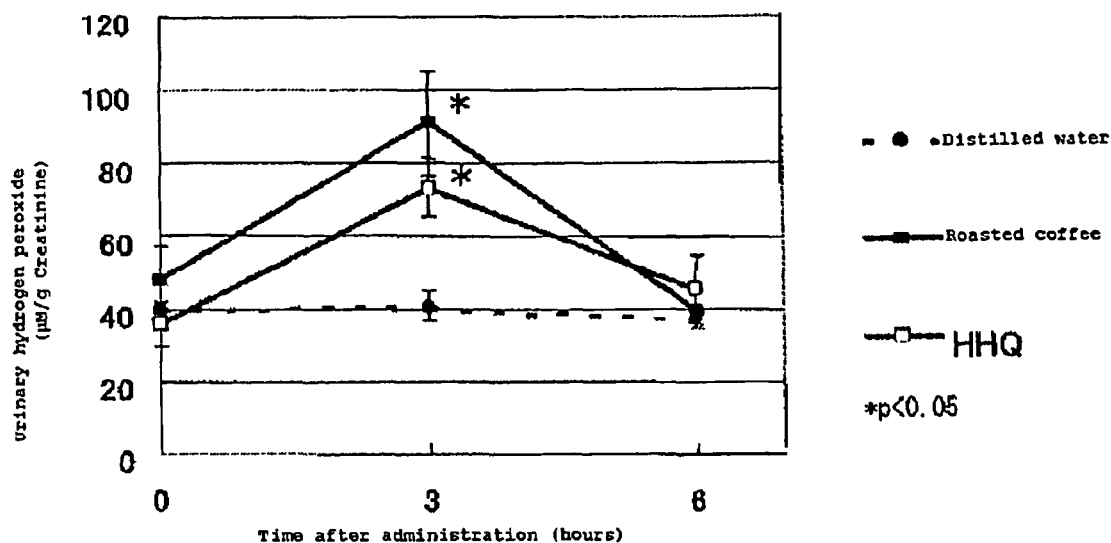
[FIG. 4]
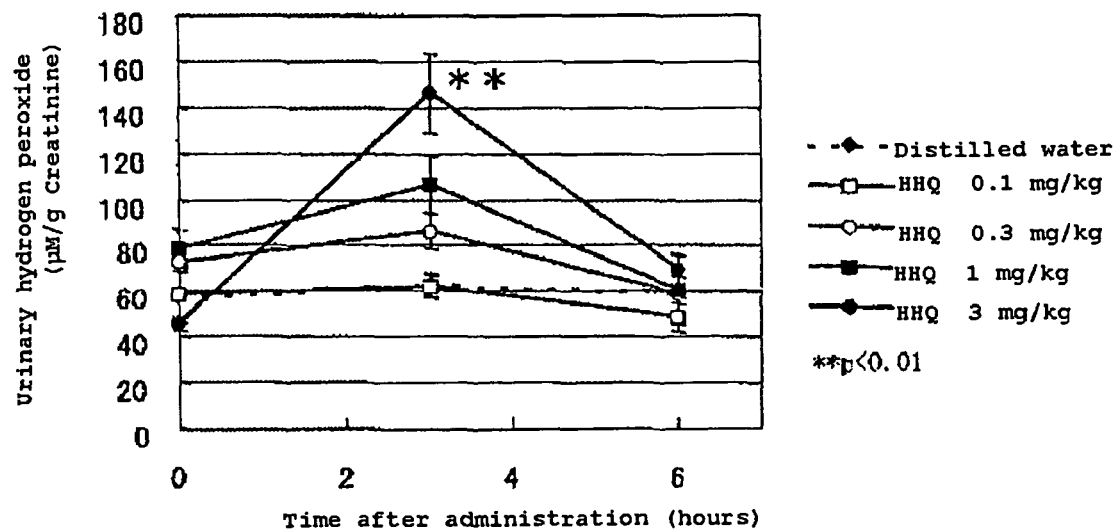

[FIG. 5]
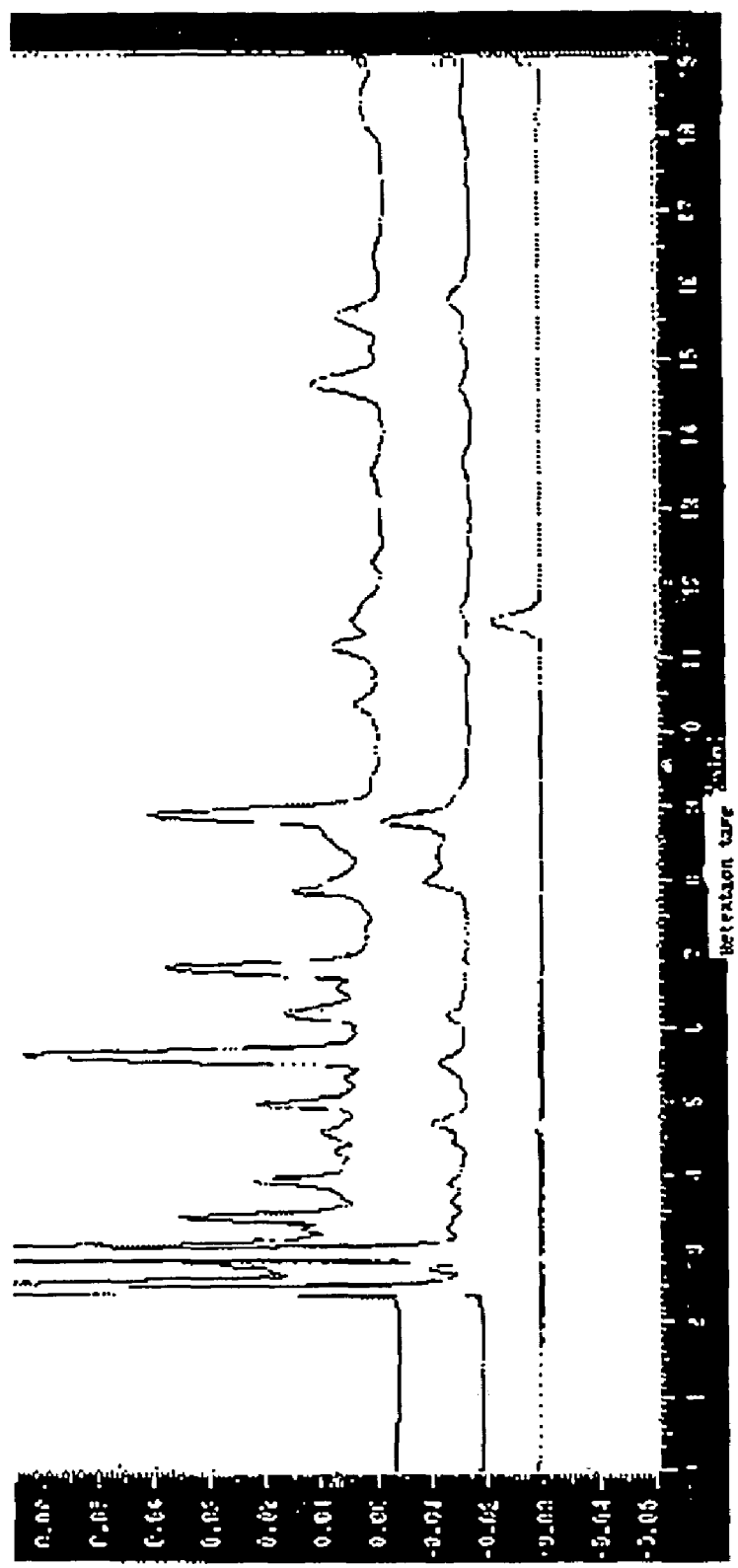

[FIG. 6]
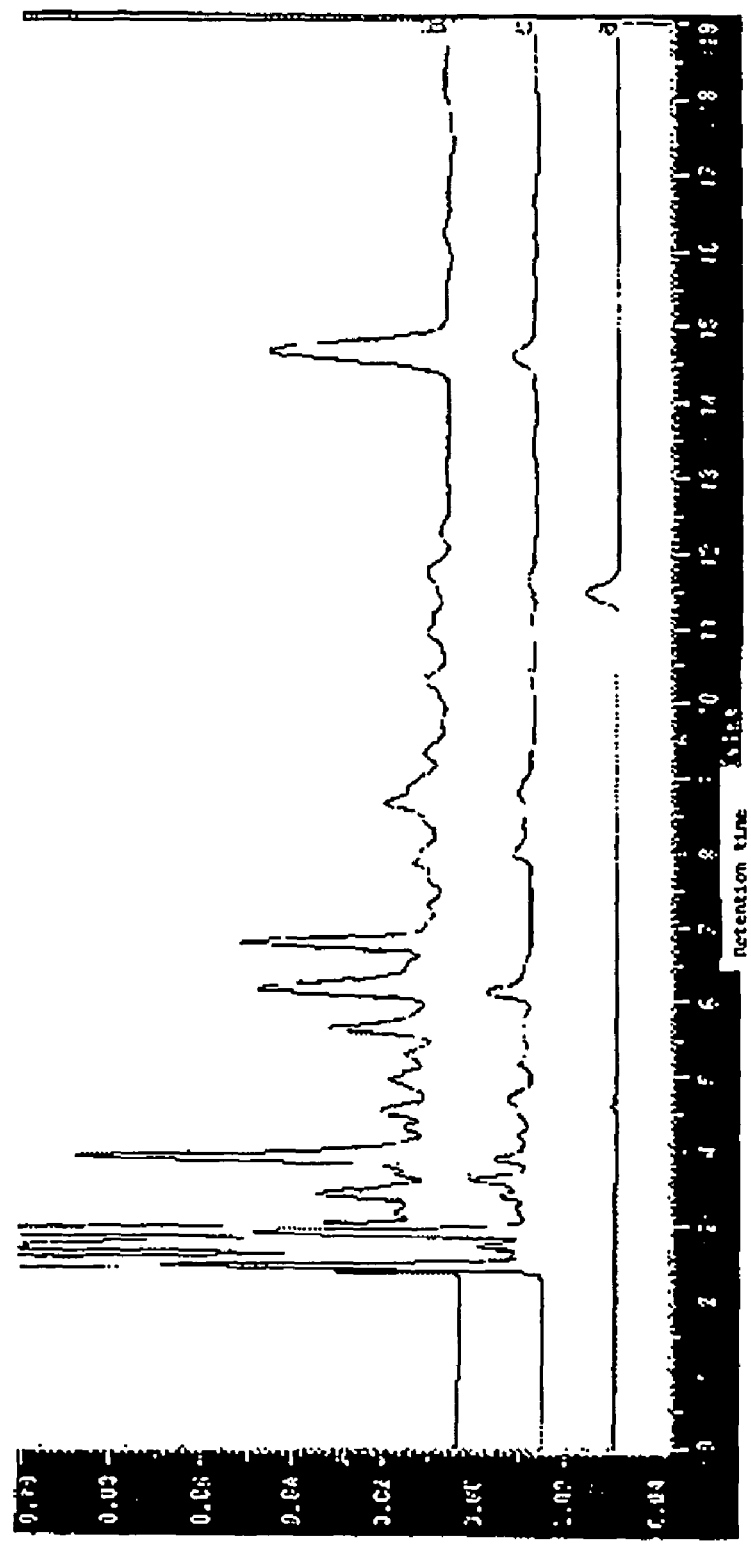

[FIG. 7]
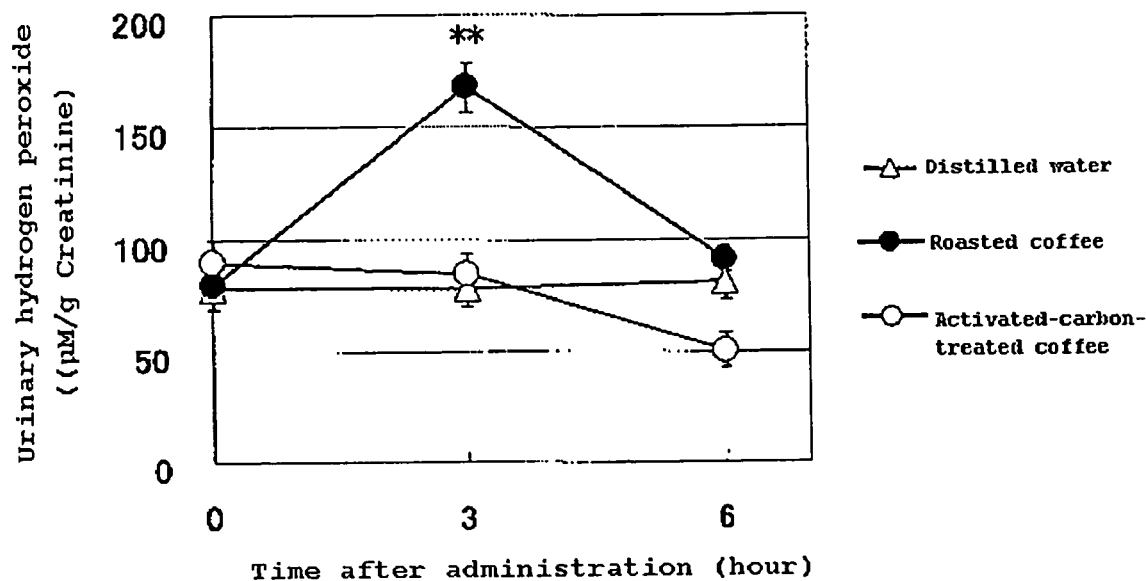
[FIG. 8]
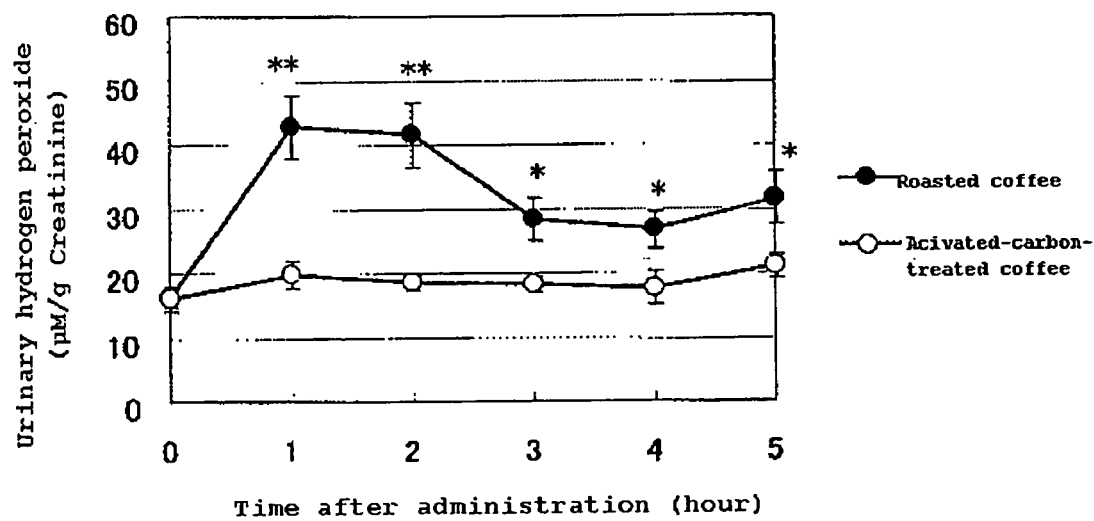

COFFEE DRINK COMPOSITION

FIELD OF THE INVENTION

The present invention relates to a coffee composition which is capable of suppressing generation of hydrogen peroxide in the body even when it is customarily taken over long periods of time.

BACKGROUND OF THE INVENTION

Hydrogen peroxide, known as one of the reactive oxygen species, is said to be deeply involved in many diseases, such as circulatory diseases such as atherosclerosis and ischemic heart diseases, digestive diseases, allergic diseases and eye diseases, as well as mutagenicity and carcinogenicity (Non-patent document 1). Coffee is known to contain hydrogen peroxide which naturally emerges when it is roasted (Non-patent document 2), and a technology of removing hydrogen peroxide from coffee by adding catalase, peroxidase or antioxidant (Patent Documents 1 to 4) has been reported.
Non-patent Document 1: Japanese Journal of Nutritional Assessment. 19, 3(2002)
Non-patent Document 2: Mutat. Res. 16, 308(2)(1994)
Patent Document 1: JP-A-H04-29326
Patent Document 2: JP-A-H03-127950
Patent Document 3: JP-A-H11-266842
Patent Document 4: JP-A-2003-81824

DISCLOSURE OF THE INVENTION

In one aspect of the present invention, there are thus provided a coffee composition having a hydroxyhydroquinone content from 0 to 0.00005 wt. % and a preparation process of the composition.

In another aspect of the present invention, there are also provided a soluble coffee composition having a hydroxyhydroquinone content from 0 to 0.001 wt. % and a preparation process of the composition.

In a further aspect of the present invention, there are also provided a packaged beverage filled with a coffee composition having a hydroxyhydroquinone content from 0 to 0.00005 wt. %.

In a still further aspect of the present invention, there are also provided a coffee composition, characterized in that in the analysis by high performance liquid chromatography, the composition has no substantial peak within a range of a relative retention time from 0.54 to 0.61 with respect to gallic acid used as a reference substance; and a packaged beverage filled with the composition.

BRIEF DESCRIPTION OF DRAWINGS

FIG. 1 is a graph showing the influence of roasted coffee on hydrogen peroxide in the body (humans).

FIG. 2 is a graph showing the influence of a hydrogen-peroxide-removed coffee on the amount of hydrogen peroxide in the body.

FIG. 3 is a graph showing a coffee component generating hydrogen peroxide in the body.

FIG. 4 is a graph showing the effect of hydroxyhydroquinone on the generation of hydrogen peroxide in the body.

FIG. 5 shows an HPLC chart (detection wavelength: 258 nm) of Coffee Q.

FIG. 6 shows an HPLC chart (detection wavelength: 288 nm) of Coffee Q.

FIG. 7 is a graph showing the influence of activated-carbon-treated coffee on the hydrogen peroxide amount in a rat body. **: There is a significant difference at a significance level of 1% or less relative to a distilled water group.

FIG. 8 is a graph showing the influence of activated-carbon-treated coffee on the hydrogen peroxide amount in a human body. *: There is a significant difference at a significant level of 5% or less relative to an activated-carbon-treated-coffee drinking group. **: There is a significant difference at a significant level of 1% or less relative to an activated-carbon-treated-coffee-drinking group.

MODE FOR CARRYING OUT THE INVENTION

The present inventors administered hydrogen-peroxide-removed coffee to rats. As a result, it has been elucidated that hydrogen peroxide was produced in their bodies and the concentration of hydrogen peroxide in urine increased. This suggests that the conventional technology of removing hydrogen peroxide from coffee beverage could not suppress the generation of hydrogen peroxide in the body after drinking of coffee.

Accordingly, an object of the present invention is to provide a coffee composition which prevents generation of hydrogen peroxide in the body after drinking.

Assuming that some components in coffee might be associated with generation of hydrogen peroxide in the body, the present inventors carried out various investigations. As a result, it has been found that hydroxyhydroquinone contained in the coffee has an effect of generating hydrogen peroxide in the body, and a coffee drink which does not accelerate the generation of hydrogen peroxide in the body is obtainable by controlling the hydroxyhydroquinone content to 0 to 0.00005 wt. %, which is sufficiently smaller than the ordinary hydroxyhydroquinone content.

Even drinking of the coffee composition of the present invention does not generate hydrogen peroxide in the body. The coffee composition of the present invention is therefore useful as a beverage having high safety.

The present invention provides a coffee composition having a hydroxyhydroquinone content adjusted to 0 to 0.00005 wt. % and a soluble coffee composition having a hydroxyhydroquinone content adjusted to 0 to 0.001 wt. %. When the hydroxyhydroquinone content is within the above-described range, drinking of such compositions suppresses generation of hydrogen peroxide in the body. The hydroxyhydroquinone content in the coffee composition is preferably from 0 to 0.00003 wt. %, more preferably from 0 to 0.00001 wt. %. The hydroxyhydroquinone content in the soluble coffee composition is preferably from 0 to 0.0003 wt. %, more preferably from 0 to 0.0001 wt. %.

The content of the hydroxyhydroquinone can be determined by high performance liquid chromatography (HPLC). A commonly employed detection means in HPLC is UV detection, but high sensitive detection can be attained using CL (chemiluminescence detection), EC (electrochemical) detection or LC-Mass detection. The hydroxyhydroquinone content can be measured by HPLC even after concentration of the coffee drink.

While the hydroxyhydroquinone content can be determined directly by HPLC, it can also be determined by concentrating hydroxyhydroquinone and then measuring the amount of the concentrated fraction by chromatography of every kind. In the case of a packaged beverage, it is preferred to measure the amount of hydroxyhydroquinone after adding, for example, 0.1N hydrochloric acid to the beverage to prepare an acid solution having a pH of 3 or less just after the package is opened.

By drinking two cups (280 g) of commercially available instant coffee, a significant increase in the urinary hydrogen peroxide amount turns out to take place (FIG. 1). Rats to which ordinary coffee was administered and rats to which hydrogen-peroxide-removed coffee was administered show almost an equal level of an increase in the amount of hydrogen peroxide in urine (FIG. 2). Therefore it is apparent that a certain coffee component is largely involved in generation of hydrogen peroxide in the body, but the hydrogen peroxide contained in coffee has no significant role in increasing the amount of hydrogen peroxide in urine after drinking.

The present inventors therefore investigated the capacity of various components contained in the coffee to generate hydrogen peroxide in the body. As a result, it has been found that from 0.2 to 3 mg/190 g of hydroxyhydroquinone is usually contained in a commercially available coffee, but only the intake of a very small amount of it increases the generation amount of hydrogen peroxide in the body (FIGS. 3 and 4), and drinking of coffee having a hydroxyhydroquinone content adjusted to 0.00005 wt. % or less suppresses the generation of hydrogen peroxide in the body (FIG. 7).

The coffee composition and soluble coffee composition according to the present invention each preferably contain ordinary coffee components except for inclusion of a reduced hydroxyhydroquinone content.

The coffee composition of the present invention contains, based on 100 g thereof, preferably from 30 to 300 mg/100 g, more preferably from 40 to 250 mg/100 g, even more preferably from 50 to 200 mg/100 g of potassium. The soluble coffee composition of the present invention contains, based on 1 g thereof, preferably from 20 to 200 mg/1 g, more preferably from 30 to 180 mg/1 g, even more preferably from 40 to 150 mg/1 g of potassium from the viewpoint of the taste which coffee originally has. The potassium concentration can be measured using, for example, atomic absorption spectrophotometry. In order to keep the potassium content to fall within the above-described range, it is preferred not to remove potassium positively during the preparation of the coffee composition.

The coffee composition of the present invention has, based on 100 g of the coffee composition, an ash content of preferably 280 mg or less, more preferably 250 mg or less, still more preferably 220 mg or less, yet still more preferably 200 mg or less from the viewpoint of the taste which coffee originally has. The ash content can be measured in accordance with the method as described in STANDARD TABLES OF FOOD COMPOSITION IN JAPAN Fourth Revised and Enlarged Edition (p28, published in 1982, edited by Resources Review Commission/THE SCIENCE AND TECHNOLOGY AGENCY OF JAPAN), by heating at 550° C. and continuing ashing until the residual carbon disappears to obtain a constant weight. In order to keep the ash content to fall within the above-described range, it is preferred not to carry out an operation which may increase the ash content during the preparation steps of the coffee composition, for example, an operation of treating with a strong alkali and then returning the pH to a neutral region with an acid.

The coffee composition of the present invention preferably has an $H_2O_2$ hydrogen peroxide) content preferably not greater than 1 ppm, more preferably not greater than 0.1 ppm, even more preferably not greater than 0.01 ppm from the viewpoint of the taste which coffee originally has. The hydrogen peroxide content can be measured using an ordinarily employed hydrogen peroxide meter, for example, a high sensitivity hydrogen peroxide meter "SUPER ORITECTOR MODEL 5" of Central Kagaku Co.

Although no particular limitation is imposed on the kinds of coffee beans to be used for the coffee composition of the present invention, Brazil, Columbia, Tanzania, Mocha and the like can be used for example. The coffee has following species, that is, *Arabica* and *Robusta*. As coffee beans, either one kind or a blend of two or more kinds may be used. No particular limitation is imposed on the roasting method of coffee beans or roasting environment including roasting temperature and ordinary methods can be employed. In addition, no limitation is imposed on an extraction method from the beans. The extraction is carried out, for example, by extracting roasted or roasted and ground coffee beans with water (from 0 to 100° C.) for 10 seconds to 30 minutes. Examples of the extraction method include boiling system, espresso system, siphon system, and dripping system (through paper, flannel or the like).

The term "coffee composition" as used herein means a drink composition using 1 g or greater, preferably 2.5 g or greater, more preferably 5 g or greater of coffee beans in terms of raw beans, per 100 g of the composition. When the coffee composition of the present invention is provided as a packaged beverage, it is preferably single strength. The term "single strength" as used herein means a drink which can be taken without dilution under an ordinary state after the packaged beverage is opened.

The coffee composition or soluble coffee composition of the present invention is obtainable by treating the extract of roasted coffee beans with an adsorbent to reduce its hydroxyhydroquinone content. Examples of the adsorbent include activated carbon and reversed phase carrier. More specifically, the composition is available by adding the adsorbent to the extract of roasted coffee beans or an aqueous solution of the dried extract of roasted coffee beans, stirring the resulting mixture at 0 to 100° C. for 10 minutes to 5 hours and then removing the adsorbent. The activated carbon or reversed phase carrier serving as the adsorbent is preferably added in an amount of 0.02 to 1.0 time or from 2 to 100 times, respectively, each based on the weight of the roasted coffee beans. As the activated carbon, that activated by a zinc chloride method or steam activation method can be used, with the latter being preferred. As the kind of the activated carbon, coconut shell activated carbon is preferred, with coconut shell activated carbon activated by steam being more preferred. Examples of the commercially available activated carbon include "Shirasagi $WH_2c$" (product of Japan EnviroChemicals, Ltd.), "Taiko CW" (product of Futamura Chemical Co., Ltd.), and "KURARAYCOAL GW" (product of KURARAY CHEMICAL CO., LTD). Examples of the reversed phase carrier include "YMCΩODS-A" (product of YMC Co., Ltd.) and C18 (product of GL Sciences, Inc).

Among them, the treatment using activated carbon as the adsorbent is preferred because it can reduce the hydroxyhydroquinone content selectively without reducing the chlorogenic acid content, is industrially advantageous and moreover, does not reduce the potassium content (the potassium content of ⅕ or greater, especially ½ or greater is maintained based on the weight ratio.)

The hydroxyhydroquinone content in the coffee composition or soluble coffee composition of the present invention can be detected by high performance liquid chromatography as a peak within a range of a relative retention time from 0.54 to 0.61 with respect to gallic acid employed as a reference substance. Accordingly, the coffee composition of the present invention can be defined as a coffee composition having no substantial peak within a range of a relative retention time from 0.54 to 0.61 with respect to gallic acid employed as a reference substance. The soluble coffee composition of the present invention can be defined as a soluble coffee composition having no substantial peak within a range of a relative retention time from 0.54 to 0.61 with respect to gallic acid employed as a reference substance. The analysis by high performance liquid chromatography in the above definition is carried out under analysis conditions B described later.

In order to confirm that the coffee composition of the present invention has no substantial peak within a range of a relative retention time of from 0.54 to 0.61 with respect to gallic acid employed as a reference substance, conventional HPLC can be used. For example, it can be confirmed by the detection using gradient elution with a 0.05M aqueous acetic acid solution and a 0.05M acetic acid/100% acetonitrile solution as eluents, an ODS column and an ultraviolet absorptiometer or the like.

"The composition of the present invention has no substantial peak within a range of a relative retention time from 0.54 to 0.61 with respect to gallic acid employed as a reference substance" means that the following equation holds: S2/S1<0.01 in which S1 represents a peak area of a 1 ppm solution of gallic acid at the time of analysis and S2 represents the sum of peak areas derived from components eluted in the above specified region when the coffee composition is analyzed under the same conditions.

The coffee composition of the present invention may contain sugar such as sucrose, glucose, fructose, xylose, high-fructose corn syrup and sugar alcohol, milk constituent, antioxidant, pH regulator, emulsifier and flavor as desired. Examples of the milk constituent include raw milk, whole milk, powdered whole milk, skimmed milk powder, dairy cream, concentrated milk, skimmed milk, partially skimmed milk and condensed milk. The coffee composition of the present invention preferably has a pH from 3 to 7.5, more preferably from 4 to 7, even more preferably from 5 to 7 from the viewpoint of the stability of the composition.

The term "soluble coffee composition" means powdered food such as instant coffee powder and the like. The instant coffee powder can be prepared in a conventional manner. For example, it can be prepared by spray drying, that is, spraying a coffee extract from a nozzle and dropping it in a hot wind of about 210 to 310° C., thereby forming porous and water soluble coffee powder; or freeze drying, that is, freezing a coffee extract by using liquid nitrogen or refrigerator, grinding the frozen coffee extract, sifting the resulting particles, and sublimating water under vacuum to reduce the water content to 3% or less.

The coffee composition or soluble coffee composition of the present invention can be filled in a container such as PET bottle, can (aluminum or steel), paper, retort pouch, or bottle (glass). In this case, a 50 to 2500-mL packaged beverage is available by filling the coffee composition of the present invention as is in such a container. The packaged beverage has preferably a pH of 5 to 7.5, more preferably 5.4 to 7. As the container, an oxygen impermeable container is preferred for preventing the deterioration of the components in the coffee. For example, can such as aluminum can or steel can or bottle made of glass is preferred. The term "can" or "bottle" also means a reseal-type can or bottle that may be recapped for successive use. The term "oxygen impermeable container" as used herein means that the container has oxygen permeability (cc·mm/m²·day·atm) of preferably 5 or less, more preferably 3 or less, even more preferably 1 or less as measured in an environment having a humidity of 50% or less.

The soluble coffee composition of the present invention can be taken after dissolving 1 g of it in 25-500 mL of water or hot water.

Preparation of packaged beverages usually needs sterilization treatment. After the beverage is filled in a container such as metal can, the container having the beverage therein is then sterilized under conditions as specified by Food Sanitation Law if it can withstand heat sterilization. When the container cannot withstand retort sterilization, for example, a PET bottle or paper container, employed is a method of sterilizing the beverage under similar sterilization conditions to those specified by Food Sanitation Law, for example, subjecting the beverage to high-temperature short-time sterilization on a plate type heat exchanger, cooling it to a predetermined temperature and then, filling it in the container. Or, it is possible to sterilize the beverage by heating under sterile conditions and adjust the pH to neutral again under sterile conditions; or to sterilize the beverage by heating under neutral conditions and adjust the pH to acidic again under sterile conditions.

EXAMPLES

Example 1

Influence of Roasted Coffee on the Amount of Hydrogen Peroxide in the Body (a) Preparation of Roasted Coffee In 280 mL of mineral water was dissolved 4 g of instant coffee (Nescafe decaffeinated). The chlorogenic acid content and HHQ content in 280 mL of the resulting coffee are 210 mg and 2.6 mg, respectively.

(b) Six male volunteers were asked to take the resulting coffee (280 mL) and from one to five hours later, the amount of hydrogen peroxide in urine was measured. The amount of hydrogen peroxide in urine was measured by FOX (ferrous ion oxidation-xylenol orange) assay.

As a result, it has been found that as illustrated in FIG. 1, an amount of hydrogen peroxide in human urine increases by intake of roasted coffee.

Example 2

Influence of Hydrogen-Peroxide-Removed Coffee on the Amount of Hydrogen Peroxide in the Body (a) Roasted Coffee In 26 mL of distilled water was dissolved 10 g of instant coffee (Nescafe decaffeinated).

(b) Hydrogen-Peroxide-Removed Coffee

After 10 g of instant coffee (Nescafe decaffeinated) was dissolved in 23 mL of distilled water, 3 mL of a catalase solution (product of Central Kagaku Corp.) was added to the resulting solution.

(c) The coffees obtained above in (a) and (b) were each forcibly administered p.o. (10 mL/kg) to six-week-old male SD rats (n=4). Three hours after the administration, urine was collected and the amount of hydrogen peroxide in their urine was measured. The amount of hydrogen peroxide in urine was measured by FOX (ferrous ion oxidation-xylenol orange) assay.

As a result, as illustrated in FIG. 2, the amount of hydrogen peroxide in urine increased by the administration of the roasted coffee and its increase ratio changed little even by the removal of hydrogen peroxide from the roasted coffee. This suggests that hydrogen peroxide is generated newly in the body by the administration of the roasted coffee.

Example 3

Component which Generates Hydrogen Peroxide in the Body (a) Roasted coffee

Instant coffee (Nescafe decaffeinated) was dissolved in the below-described eluent A to prepare 20 mg/mL of a coffee solution.

As a result of determination, the amount of hydroxyhydroquinone in the roasted coffee was 0.0013 wt. %. The hydroxyhydroquinone amount in the roasted coffee is analyzed in the following manner. The analysis conditions described below are designated as analysis conditions A. As the analytical instrument, HPLC (product of Shimadzu Corp.) was employed. Each unit constituting the instrument has the following model number: detector: "SPD-M10A", oven: "CTO-10AC", pump: "LC-10AD", autosampler: "SIL-10AD", and column: "Inertsil ODS-2" 4.6 mm in inner diameter×250 mm in length.

The analysis conditions are as follows: sample injection amount: 10 µL, flow rate: 1.0 mL/min, detection wavelength of UV absorptiometer: 290 nm, eluent A: a 0.05M acetic acid 3% acetonitrile solution, eluent B: a 0.05M acetic acid 100% acetonitrile solution.

Concentration gradient conditions

| Time | Eluent A | Eluent B |
| --- | --- | --- |
| 0 minute | 100% | 0% |
| 20 minutes | 80% | 20% |
| 35 minutes | 80% | 20% |
| 45 minutes | 0% | 100% |
| 60 minutes | 0% | 100% |
| 70 minutes | 100% | 0% |
| 120 minutes | 100% | 0% |

The retention time of hydroxyhydroquinone: 5.5 minutes. From the area calculated here, the content (wt. %) was determined using hydroxyhydroquinone as a standard substance.

The hydroxyhydroquinone content in the coffee composition can also be determined by the below-described analysis method. The following analysis conditions are designated as analysis conditions B. As the analytical instrument, HPLC (product of Hitachi, Ltd.) was employed. Each unit constituting the instrument has the following model number: detector: L-7455, oven: L-7300, pump: L-7100 autosampler: L-7200, column: Inertsil ODS-2 having 4.6 mm in inner diameter× 250 mm in length.

The analysis conditions are as follows: sample injection amount: 10 µL, flow rate: 1.0 mL/min, detection wavelength of UV absorptiometer: 258 or 288 nm, eluent A: 0.05M aqueous acetic acid solution, eluent B: 0.05M acetic acid 100% acetonitrile solution.

Concentration gradient conditions

| Time | Eluent A | Eluent B |
| --- | --- | --- |
| 0 minute | 100% | 0% |
| 15 minutes | 100% | 0% |
| 15.1 minutes | 0% | 100% |
| 25 minutes | 0% | 100% |
| 25.1 minutes | 100% | 0% |
| 30 minutes | 100% | 0% |

The retention time of hydroxyhydroquinone was 6.8 minutes. From the area calculated here, the content (wt. %) was determined using hydroxyhydroquinone as a standard substance. The retention time of gallic acid determined in a similar manner was 11.5 minutes.

(b) To 7-week-old male SD rats (n=4), 2.4 g/kg of instant coffee (Nescafe decaffeinated) (1.6 mg/kg in terms of hydroxyhydroquinone) and 1.6 mg/kg of hydroxyhydroquinone were forcibly administered p.o, respectively. Prior to administration and three hours and six hours after administration, urine was collected from them and the amount of hydrogen peroxide in urine was measured as in Example 2.

As a result, as illustrated in FIG. 3, the amount of hydrogen peroxide in urine three hours after administration showed a significant increase in each of the group administered with hydroxyhydroquinone and the group administered with the roasted coffee. These two groups are on the same level in the increased amount of hydrogen peroxide in urine. This suggests that a substance contained in coffee and generating hydrogen peroxide in the body is hydroxyhydroquinone.

Example 4

To seven-week-old male SD rats (n=3), hydroxyhydroquinone (0.1, 0.3, 1 and 3 mg/kg, respectively) was forcibly administered p.o. Prior to administration and three and six hours after administration, urine was collected from them and the amount of hydrogen peroxide in the urine was determined as in Example 2.

As a result, it has been found that as illustrated in FIG. 4, the amount of hydrogen peroxide in the body increases dose-dependently by the administration of 0.3 mg/kg or greater of hydroxyhydroquinone.

Example 5

The coffee composition of the present invention was prepared in the following manner. Instant coffee (2.5 g, "Nescafe Decaffeinated") was applied to a column filled with 500 g of an ODS filler ("YMC TGEL ODS-A" having a pore size of 6 mm and average particle size of 150 µm), followed by elution of a hydroxyhydroquinone-containing fraction with 6 L of a 0.5% aqueous acetic acid solution and elution of a hydroxyhydroquinone-free fraction with 6 L of methanol. From the hydroxyhydroquinone-free fraction A, methanol was removed completely by the freeze-drying method. From 2.5 g of the instant coffee, 0.933 g of the fraction A was obtained. The fraction A was analyzed by the method described in Example 3, resulting in no detection of hydroxyhydroquinone in the fraction A. By dissolving 0.75 g of the fraction A in 140 mL of water, the coffee composition of the present invention was prepared.

The amount of hydrogen peroxide in the coffee composition of the present invention was analyzed using a high sensitivity hydrogen peroxide meter, but the amount of hydrogen peroxide was not detected because it was below the detection limit. Hydrogen peroxide was analyzed in the following manner. For the measurement, "SUPER ORITECTOR MODEL 5" (product of Central Kagaku Corp.), a high sensitivity hydrogen peroxide tester, was employed. Into a reaction cell of the tester, 2 mL of a sample precisely weighed by a one-mark pipette was injected. After the reaction cell was hermetically sealed, a proper measurement range was selected and a starting switch for measurement was turned on. As soon as a beep sound indicating that the instrument is ready for measurement was confirmed, 20 µL of catalase for ORITECTOR was injected via a microsyringe and an output value was read.

The instrument was calibrated with each of 0.1, 1 and 5 mg/L hydrogen peroxide standard solutions.

For the preparation of the hydrogen peroxide standard solution, a stock solution obtained by diluting hydrogen peroxide (a 30% aqueous solution, special grade, product of Wako Pure Chemical Industries, Ltd.) with deionized water to 1,000 mg/L was used. The stock solution was diluted with an extracting solution to prepare a 5 mg/L standard solution of hydrogen peroxide. With an extracting solvent, the 5 mg/L standard solution of hydrogen peroxide was diluted further with an extracting solution to prepare 1 mg/L and 0.1 mg/L standard solutions.

The extracting solution (0.2M phosphate buffer containing 0.5% potassium bromate, pH 7.0) was prepared by dissolving 11.0 g of potassium dihydrogen phosphate (special grade), 44.8 g of disodium hydrogen phosphate 12 hydrate (special grade) and 5.0 g of potassium bromate (special grade) in deionized water to prepare a 1 L of the resulting solution precisely. When the resulting extracting solution was provided for use, a nitrogen gas was introduced into the solution for at least one hour under ice cooling in advance.

Example 6

The soluble coffee of the present invention was prepared by grinding the fraction A obtained in Example 5.

Example 7

The coffee composition of the present invention was also prepared by the following method.

Preparation of Coffee Treated with Activated Carbon

After 20 g of commercially available instant coffee (Nescafe Gold Blend with Red Label) was dissolved in 1400 mL of distilled water (the solution thus obtained will hereinafter be called "Coffee P"), 30 g of activated carbon "Shirasagi $WH_2c$ 28/42" (product of Japan EnviroChemicals, Ltd.) was added to the resulting solution. The resulting mixture was stirred for one hour and then, filtered through a membrane filter (0.45 µm) to yield a filtrate (which will hereinafter be called "Coffee Q"). The resulting filtrate was freeze dried, whereby 15.8 g of brown powder was obtained. The resulting brown powder was dissolved in distilled water and amounts of chlorogenic acids and HHQ were determined by HPLC analysis as in Example 1. As a result, the chlorogenic acid content was 4.12 wt. %, while the HHQ content was below the detection limit (in accordance with the analysis conditions B). In addition, the potassium content was measured by ICP emission spectrometry. The potassium content in each of the raw material instant coffee and coffee treated with activated carbon was about 4.2 wt. %. Analysis results of coffee P, coffee Q and gallic acid by HPLC are shown by the respective charts in FIGS. 5 and 6. In coffee Q, a peak in the vicinity of a retention time of 6.8 minutes disappears and there exists no peak substantially. In FIG. 5, a represents the chart of coffee P, b represents the chart of coffee Q and c represents a chart of gallic acid. In FIG. 6, b represents the chart of coffee P, c represents the chart of coffee Q and a represents the chart of gallic acid.

The hydroxyhydroquinone (HHQ) content in the coffee composition of the present invention was also measured in the following manner.

Measurement of Hydroxyhydroquinone

The hydroxyhydroquinone content in the coffee composition was analyzed as described below. "CoulArray System" (Model 5600A, developed and manufactured by ESA/USA, imported and sold by MC Medical Inc.), an HPLC-electrochemical detector (coulometric array system) was used as an analytical instrument. The name and model number of the units constituting the instrument are as follows:

Analytical cell: "Model 5010", Coularray organizer, Coularray electronics moduleΩsoftware: "Model 5600A", solvent delivery module: "Model 582", gradient mixer, autosampler: "Model 542", pulse damper, degasser: "Degasys Ultimate DU3003", Column oven: "505", Column: "CAPCELL PAK C18 AQ" 4.6 mm in inner diameter×250 mm in length, particle size: 5 µm (product of Shiseido Co., Ltd.)

Analysis was conducted under the following conditions:

Injection amount of sample: 10 µL, flow rate: 1.0 mL/min, voltage applied to the electrochemical detector: 0 mV, set temperature of the column oven: 40° C., eluent A: 0.1 (W/V) % phosphoric acid, 0.1 mM 1-hydroxyethane-1,1-diphosphonic acid, 5 (V/V) % methanol solution, eluent B: 0.1 (W/V) % phosphoric acid, 0.1 mM 1-hydroxyethane-1,1-diphosphonic acid, 50 (V/V) % methanol solution.

For the preparation of each of the eluents A and B, employed were distilled water for high performance liquid chromatography (product of Kanto Chemical Co., Inc.), methanol for high performance liquid chromatography (product of Kanto Chemical Co., Inc.), phosphoric acid (special grade, product of Wako Pure Chemical Industries, Ltd.), and 1-hydroxyethane-1,1-diphosphonic acid (a 60% aqueous solution, product of Tokyo Chemical Industry Co., Ltd.).

Concentration Gradient Conditions

| Time | Eluent A | Eluent B |
|---|---|---|
| 0.0 minute | 100% | 0% |
| 10.0 minutes | 100% | 0% |
| 10.1 minutes | 0% | 100% |
| 20.0 minutes | 0% | 100% |
| 20.1 minutes | 100% | 0% |
| 50.0 minutes | 100% | 0% |

An analysis sample was prepared in the following manner. After 2 g of a sample was weighed precisely, the eluent A was added to give a total amount of 10 mL. The resulting mixture was filtered through a membrane filter ("HLC-DISK25 for solvents", pore size: 0.45 µm, for high performance liquid chromatography, product of Kanto Chemical Co., Inc.), and about 2.5 mL of the resulting filtrate was introduced into "Bond Elut SCX" (product of GL Science Co., Ltd., solid phase filling amount: 500 mg, reservoir capacity: 3 mL). Immediately after removal of about 0.5 mL of the initial filtrate, the residue was provided for the analysis.

In the analysis under the above-described conditions, the retention time of hydroxyhydroquinone was 6.38 minutes. From the peak area obtained by calculation, the content (wt. %) was determined using hydroxyhydroquinone (product of Wako Pure Chemical Industries, Ltd.) as a standard substance.

When the hydrogen peroxide content of the coffee composition of the present invention was measured using a high sensitivity hydrogen peroxide tester, the hydrogen peroxide content was not detected because it was below the detection limit. The ash content was measured by the above-described method, resulting in that the ash content in the coffee P was 186 mg/100 g and that in the coffee Q was 176 mg/100 g, each in terms of an amount per 100 g of coffee drink.

Example 8

Influence of roasted coffee and activated-carbon-treated coffee (coffee composition of the present invention) prepared in Example 7 on the amount of hydrogen peroxide in rat body (a) Preparation of Roasted Coffee In 12 mL of distilled water was dissolved 8 g of instant coffee (Nescafe decaffeinated).

(b) Preparation of Activated-Carbon-Treated Coffee

In 12 mL of distilled water was dissolved 8 g of the activated-carbon-treated coffee prepared in Example 7.

(c) The coffees obtained above in (a) and (b) (each, 10 mL/kg) were forcibly administered p.o. to seven-week-old male SD rats (n=8). Prior to administration and three and six hours after the administration, urine was collected from them and the amount of hydrogen peroxide in the urine was measured as in Example 2.

As a result, it has been found as illustrated in FIG. 7, in the roasted-coffee administration group, the amount of hydrogen peroxide in urine three hours after administration shows a significant increase compared with that in the distilled-water administration group, but the activated-carbon-treated-coffee administration group and the distilled-water administration group are on the same level in the amount of hydrogen peroxide in urine.

Example 9

Influence of roasted coffee and activated-carbon-treated coffee (coffee composition of the present invention) on the amount of hydrogen peroxide in human body.

(a) Preparation of Roasted Coffee

In 280 mL of mineral water was dissolved 4.5 g of instant coffee (Nescafe decaffeinated).

(b) Preparation of Activated-Carbon-Treated Coffee

In 280 mL of mineral water was dissolved 4.5 g of the activated-carbon-treated coffee prepared in Example 7.

(c) After 280 mL of the coffees obtained above in (a) and (b) were administered to seven healthy male volunteers, the amount of hydrogen peroxide amount in their urine was measured from one to five hours after administration. This test was carried as crossover trial. The amount of hydrogen peroxide in urine was measured as in Example 2.

As a result, it has been found that as illustrated in FIG. 8, the amount of hydrogen peroxide in urine increases by drinking of the roasted coffee, but it does not increase by drinking of the activated-carbon-treated coffee, which is the coffee composition of the present invention.

Example 11

Hot water of 95° C. was added to 400 g of medium roast (L=22) ground (medium ground) decaffeinated Columbia beans charged in an ordinary extractor, whereby 3200 g of an extract was obtained. To the extract was added 50% (w/w), relative to the solid content of the extract, of activated carbon "WH2C" (product of Japan EnviroChemicals, Ltd.) and after stirring for 30 minutes, the reaction mixture was centrifuged to remove the activated carbon, whereby an HHQ-removed coffee extract was obtained. Deionized water and sodium bicarbonate were added to the extract to give a pH of 6.3. The resulting mixture was filled in a metal can having a capacity of 190 g, followed by hermetic sealing. The metal can was subjected to retort sterilization at 118.1° C. for 10 minutes, whereby a canned coffee was prepared. The pH after sterilization was 5.8.

Example 12

The freeze dried product obtained in Example 7 was provided as powder coffee.

The invention claimed is:

1. A coffee composition having a hydroxyhydroquinone content of from 0 to 0.00005 wt. %.

2. A coffee composition, characterized in that in analysis by high performance liquid chromatography, the composition has no substantial peak within a range of a relative retention time from 0.54 to 0.61 with respect to gallic acid used as a reference substance.

3. A soluble coffee composition having a hydroxyhydroquinone content of from 0 to 0.001 wt. %.

4. A packaged beverage having, filled therein, a coffee composition having a hydroxyhydroquinone content of from 0 to 0.00005 wt. %.

5. A packaged beverage having a coffee composition filled therein, characterized in that in analysis by high performance liquid chromatography, the composition has no substantial peak within a range of a relative retention time of from 0.54 to 0.61 with respect to gallic acid used as a reference substance.

6. A process for preparing the coffee composition as claimed in claim 1 or 2, which comprises treating an extract of roasted coffee beans with activated carbon.

7. The process according to claim 6, wherein the activated carbon is obtained by activation by a zinc chloride method or steam activation method.

8. A process for preparing the soluble coffee composition as claimed in claim 3, which comprises treating an extract of roasted coffee beans with activated carbon to yield a coffee composition and spray drying or freeze drying the resulting coffee composition.

* * * * *

UNITED STATES PATENT AND TRADEMARK OFFICE
CERTIFICATE OF CORRECTION

| | | |
|---|---|---|
| PATENT NO. | : 8,182,854 B2 | Page 1 of 1 |
| APPLICATION NO. | : 10/587258 | |
| DATED | : May 22, 2012 | |
| INVENTOR(S) | : Akihiko Fujii et al. | |

It is certified that error appears in the above-identified patent and that said Letters Patent is hereby corrected as shown below:

Title page, Item (56) in the References Cited "JP B-H04-29326" should read --JP B-4029326--.

Column 1, line 26 "JP-A-H04-29326" should read --JP-B-4029326--.

Signed and Sealed this
Seventh Day of August, 2012

David J. Kappos
*Director of the United States Patent and Trademark Office*